US012296302B2

(12) United States Patent
Kimtee et al.

(10) Patent No.: US 12,296,302 B2
(45) Date of Patent: May 13, 2025

(54) FILTER SYSTEM FOR A REACTOR SYSTEM

(71) Applicant: ASM IP Holding B.V., Almere (NL)

(72) Inventors: Ankit Kimtee, Phoenix, AZ (US); Rohan Rane, Tempe, AZ (US)

(73) Assignee: ASM IP Holding B.V., Almere (NL)

( * ) Notice: Subject to any disclaimer, the term of this patent is extended or adjusted under 35 U.S.C. 154(b) by 475 days.

(21) Appl. No.: 17/136,764

(22) Filed: Dec. 29, 2020

(65) Prior Publication Data

US 2021/0205758 A1 Jul. 8, 2021

Related U.S. Application Data

(60) Provisional application No. 62/957,643, filed on Jan. 6, 2020.

(51) Int. Cl.
*B01D 61/14* (2006.01)
*B01D 46/52* (2006.01)

(52) U.S. Cl.
CPC ............. *B01D 61/14* (2013.01); *B01D 46/52* (2013.01); *B01D 2313/243* (2013.01)

(58) Field of Classification Search
CPC .. B01D 61/14; B01D 46/52; B01D 2313/243; B01D 46/0041; B01D 46/58; B01D 46/2403; B01D 46/12; B01D 46/00; B01D 46/0084; B01D 46/0005; B01D 46/42; B01D 2258/0216; B01D 46/56; B01D 2201/043; B01D 2201/0438; H01L 21/67017

See application file for complete search history.

(56) References Cited

U.S. PATENT DOCUMENTS

| | | | |
|---|---|---|---|
| 5,256,285 A * | 10/1993 | Tomita | B01D 27/08 210/453 |
| 9,308,472 B2 | 4/2016 | Lai | |
| 9,970,106 B2 | 5/2018 | Goeres et al. | |
| 10,052,574 B2 | 8/2018 | Takahashi et al. | |
| 2002/0153297 A1* | 10/2002 | Bozenmayer | B01D 29/52 210/232 |
| 2003/0037730 A1 | 2/2003 | Yamasaki et al. | |

(Continued)

FOREIGN PATENT DOCUMENTS

| | | |
|---|---|---|
| CN | 208865349 U | 5/2019 |
| JP | H01139127 A | 5/1989 |

(Continued)

*Primary Examiner* — Pranav N Patel
(74) *Attorney, Agent, or Firm* — Snell & Wilmer L.L.P.

(57) ABSTRACT

A filter system of a reactor system may comprise a filter vessel comprising an outer wall; a filter plate disposed in the filter vessel; and a filter disposed on the filter plate. The filter plate may comprise a first plate face and a second plate face with a plate body spanning therebetween; a first plate hole disposed through the plate body spanning between the first plate face and the second plate face; and/or a plate hole rim protruding from the first plate surface. The plate hole rim may be disposed at or proximate a plate hole edge defining the first plate hole, and/or at least partially surrounding the first plate hole. The first filter may be disposed on the first plate face, and the first filter may engage with the plate hole rim such that the plate hole rim positions the first filter in a desired position.

8 Claims, 11 Drawing Sheets

(56) References Cited

U.S. PATENT DOCUMENTS

2007/0007218 A1* 1/2007 Hundley .............. B01D 53/323
  210/243
2009/0008341 A1* 1/2009 Townson ............. B01D 63/065
  210/336
2018/0318734 A1* 11/2018 Berg ...................... B01D 29/52

FOREIGN PATENT DOCUMENTS

| JP | H029408 A    | 1/1990 |
| JP | H10106957 A  | 4/1998 |
| JP | 2012028514 A | 2/2012 |
| KR | 20010077233 A | 8/2001 |
| KR | 20130065077 A | 6/2013 |
| WO | 2014128045 A1 | 8/2014 |

* cited by examiner

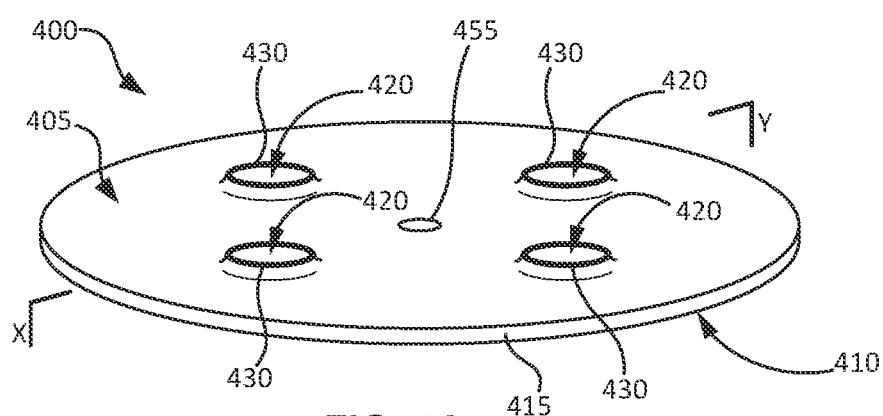
FIG. 4A
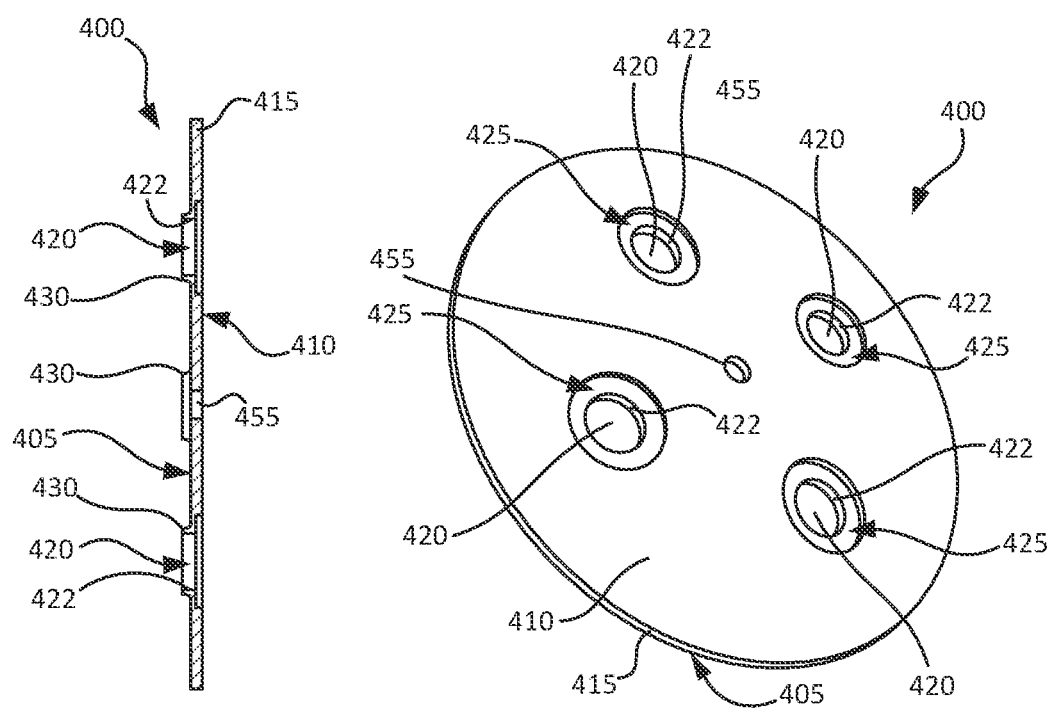
FIG. 4B
FIG. 4C

FILTER SYSTEM FOR A REACTOR SYSTEM

CROSS-REFERENCE TO RELATED APPLICATIONS

This application is a Non-provisional of, and claims priority to and the benefit of, U.S. Provisional Patent Application No. 62/957,643, filed Jan. 6, 2020 and entitled "FILTER SYSTEM FOR A REACTOR SYSTEM," which is hereby incorporated by reference herein.

FIELD OF THE DISCLOSURE

The present disclosure relates generally to a semiconductor processing or reactor system and components comprised therein, and particularly to reactor system components that prevent contamination of other components.

BACKGROUND OF THE DISCLOSURE

Reaction chambers may be used for depositing various material layers onto semiconductor substrates. A semiconductor may be placed on a susceptor inside a reaction chamber. Both the substrate and the susceptor may be heated to a desired substrate temperature set point. In an example substrate treatment process, one or more reactant gases may be passed over a heated substrate, causing the deposition of a thin film of material on the substrate surface. Throughout subsequent deposition, doping, lithography, etch, and other processes, these layers are made into integrated circuits.

For any given process, reactant gases and/or any byproduct gases may then be evacuated via a vacuum and/or purged from the reaction chamber. Reactant gases, and other gases or materials from the reaction chamber may be passed through a filter system, wherein the reactant gases or other materials (e.g., reaction products and/or byproducts) are trapped to prevent contamination of reactor system components downstream of the filter system. However, materials from the filter system may outgas under certain conditions, which may cause contamination of the reaction chamber or a substrate disposed therein.

SUMMARY OF THE DISCLOSURE

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

In some embodiments, a filter system for a reactor system is provided. The filter system disclosed herein may allow collection of materials from a reaction chamber of the reactor system to reduce or prevent contamination of reactor system components downstream of the filter system. The filter system disclosed herein may also reduce or prevent possible contaminants from traveling to and contaminating the reaction chamber or a substrate disposed therein.

In various embodiments, a filter system for a reactor system may comprise a filter vessel comprising an outer wall; a filter plate disposed in the filter vessel; and a filter disposed on the filter plate. The filter plate may comprise a first plate face and a second plate face with a plate body spanning therebetween; a first plate hole disposed through the plate body spanning between the first plate face and the second plate face; and/or a plate hole rim protruding from the first plate surface. The plate hole rim may be disposed at or proximate a plate hole edge defining the first plate hole, and/or at least partially surrounding the first plate hole. The first filter may be disposed on the first plate face, and the first filter may engage with the plate hole rim such that the plate hole rim positions the first filter in a desired position. In various embodiments, the outer wall may comprise at least one protrusion extending from the outer wall into an interior space of the filter vessel, which comprises the first filter.

In various embodiments, the first filter may comprise a filter bore through at least a portion of a length of the first filter, wherein the filter bore may be in fluid communication with the first plate hole. In various embodiments, the filter bore may be disposed through a filter first end, the filter first end being opposite a filter second end. In various embodiments, a shape of the plate hole rim may be complementary to a shape of the filter bore at the filter first end. The filter first end may be contacting the first plate face, such that the plate hole rim is disposed within the filter bore.

In various embodiments, the first filter may comprise a filter material surrounding the filter bore and spanning between the filter first end and the filter second end, wherein the filter first end may comprise a first filter end cap disposed thereon, and the filter second end may comprise a second filter end cap disposed thereon. The first filter end cap and/or the second filter end cap may be coupled to a support bar spanning between the first filter end cap and the second filter end cap, wherein the support bar may be monolithic or integral with the first filter end cap and/or the second filter end cap.

In various embodiments, the filter system may further comprise a baffle plate disposed on the filter second end, wherein the filter bore is disposed through the filter second end, and the baffle plate prevents or reduces a fluid from entering the filter bore through the filter second end. The baffle plate may facilitate the fluid passing through a side of the first filter between the filter first end and the filter second end. In various embodiments, the filter system may further comprise a plurality of filters, including the first filter, disposed in the filter vessel, wherein the baffle plate may comprise a baffle plate hole disposed through the baffle plate facilitating a portion of the fluid to flow between the plurality of filters. In various embodiments, the filter system may further comprise a plurality of plate holes, including the first plate hole, disposed through the plate body, each having a respective plate hole rim disposed at or proximate a respective plate hole edge for each of the plurality of plate holes. Each of the plurality of filters may comprise a respective filter bore, wherein each respective plate hole rim of the plurality of plate holes may be disposed within the respective filter bore of one of the plurality of filters.

In various embodiments, the filter vessel may comprise a vessel bottom surface comprising a vessel bottom hole disposed through the vessel bottom surface, wherein the filter plate may be disposed on the vessel bottom surface such that the first plate hole and the filter bore may be in fluid communication with the vessel bottom hole. In various embodiments, the vessel bottom surface may comprise a vessel bottom rim protruding from the vessel bottom surface and at least partially surrounding the vessel bottom hole, wherein the vessel bottom rim may engage with the filter plate to control a position of the filter plate.

In various embodiments, the filter plate may comprise a filter plate recess into the plate body through the second plate face, wherein a shape of the filter plate recess may be complementary to a shape of the vessel bottom rim. In various embodiments, the vessel bottom rim may be disposed in the filter plate recess. In various embodiments, the filter plate recess may at least partially surround the first plate hole.

In various embodiments, a method may comprise flowing a fluid from a reaction chamber into a filter system; flowing the fluid into a filter vessel and through a first filter comprised therein; collecting a contaminant comprised in the fluid in the filter material of the first filter as the fluid flows through the filter; and/or flowing the fluid through a first plate hole disposed through a filter plate. In various embodiments, the filter may comprise the filter material and a first filter bore disposed through the filter material, wherein the filter material may span a filter length between a filter first end and a filter second end. The first filter bore may be disposed at least through the filter first end, and the fluid may flow through the filter material and then through the first filter bore. In various embodiments, the filter plate may comprise a first plate face and a second plate face with a plate body spanning therebetween, and a plate hole rim protruding from the first plate surface that engages with the first filter to maintain the first filter in a desired position. The first filter bore and the first plate hole may be in fluid communication through the filter first end. The filter plate may be disposed on a vessel bottom surface of the filter vessel.

In various embodiments, the method may further comprise flowing the fluid through a vessel bottom hole disposed through the vessel bottom surface, wherein the first plate hole may be in fluid communication with the vessel bottom hole. In various embodiments, the method may further comprise collecting a portion of the contaminant on an interior surface of an outer wall of the filter vessel, wherein the interior surface may comprise at least one protrusion extending into an interior space of the filter vessel.

For the purpose of summarizing the disclosure and the advantages achieved over the prior art, certain objects and advantages of the disclosure have been described herein above. Of course, it is to be understood that not necessarily all such objects or advantages may be achieved in accordance with any particular embodiment of the disclosure. Thus, for example, those skilled in the art will recognize that the embodiments disclosed herein may be carried out in a manner that achieves or optimizes one advantage or group of advantages as taught or suggested herein without necessarily achieving other objects or advantages as may be taught or suggested herein.

All of these embodiments are intended to be within the scope of the disclosure. These and other embodiments will become readily apparent to those skilled in the art from the following detailed description of certain embodiments having reference to the attached figures, the disclosure not being limited to any particular embodiment(s) discussed.

BRIEF DESCRIPTION OF THE DRAWING FIGURES

While the specification concludes with claims particularly pointing out and distinctly claiming what are regarded as embodiments of the disclosure, the advantages of embodiments of the disclosure may be more readily ascertained from the description of certain examples of the embodiments of the disclosure when read in conjunction with the accompanying drawings. Elements with the like element numbering throughout the figures are intended to be the same.

FIG. 4A illustrates a top perspective view of an exemplary filter plate comprised in a filter system, in accordance with various embodiments;

FIG. 4B illustrates a cross-sectional view of the filter plate of FIG. 4A along the axis X-Y shown in FIG. 4A, in accordance with various embodiments;

FIG. 4C illustrates a bottom perspective view of an exemplary filter plate comprised in a filter system, in accordance with various embodiments;

DETAILED DESCRIPTION

Figure 1:
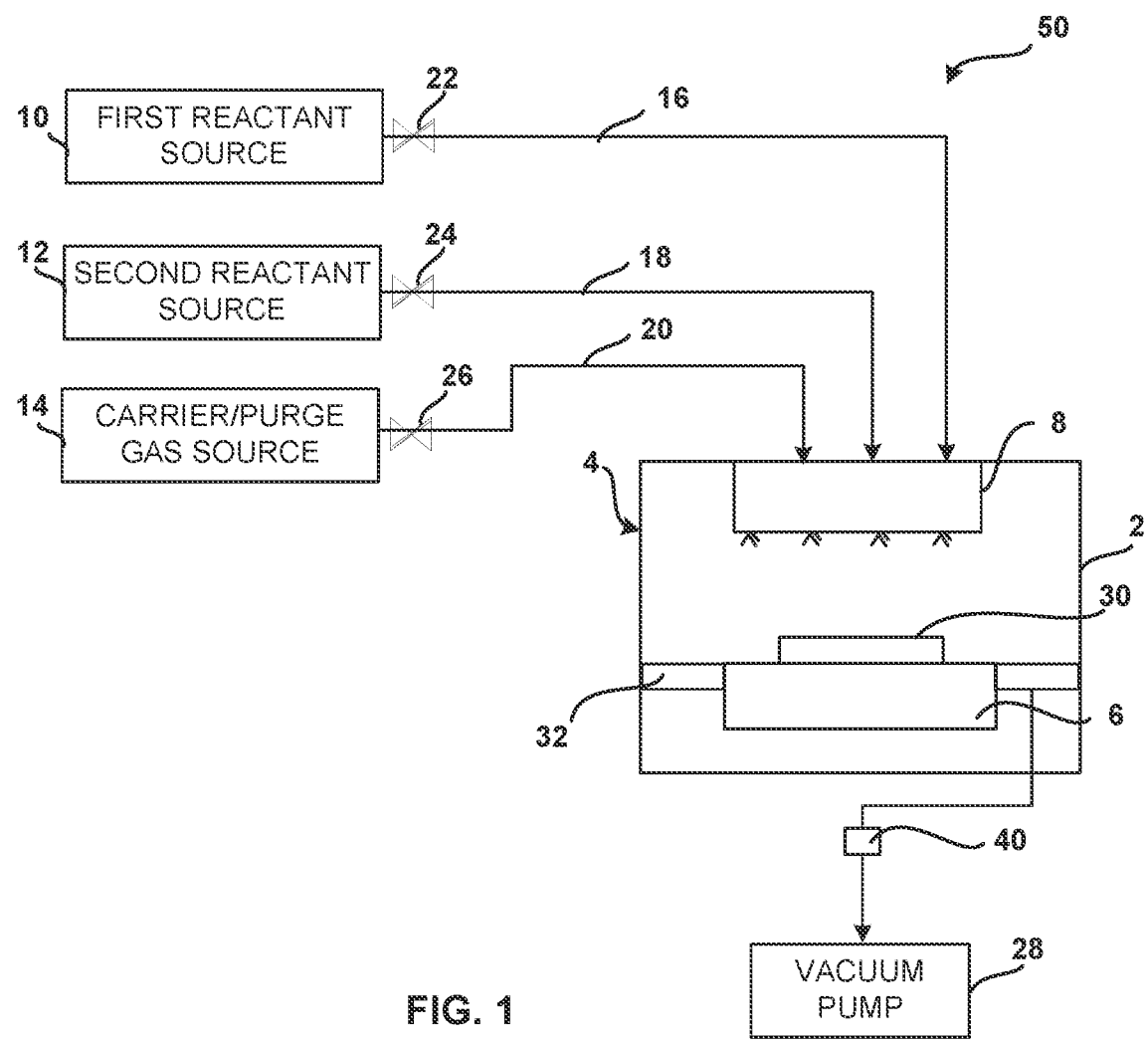
FIG. 1 illustrates a schematic diagram of an exemplary reactor system, in accordance with various embodiments.

Although certain embodiments and examples are disclosed below, it will be understood by those in the art that the disclosure extends beyond the specifically disclosed embodiments and/or uses of the disclosure and obvious modifications and equivalents thereof. Thus, it is intended that the scope of the disclosure should not be limited by the particular embodiments described herein.

The illustrations presented herein are not meant to be actual views of any particular material, apparatus, structure, or device, but are merely representations that are used to describe embodiments of the disclosure.

As used herein, the term "substrate" may refer to any underlying material or materials that may be used, or upon which, a device, a circuit, or a film may be formed.

As used herein, the term "atomic layer deposition" (ALD) may refer to a vapor deposition process in which deposition cycles, preferably a plurality of consecutive deposition cycles, are conducted in a process chamber. Typically, during each cycle the precursor is chemisorbed to a deposition surface (e.g., a substrate surface or a previously deposited underlying surface such as material from a previous ALD cycle), forming a monolayer or sub-monolayer that does not readily react with additional precursor (i.e., a self-limiting reaction). Thereafter, if necessary, a reactant (e.g., another precursor or reaction gas) may subsequently be introduced into the process chamber for use in converting the chemisorbed precursor to the desired material on the deposition surface. Typically, this reactant is capable of further reaction with the precursor. Further, purging steps may also be utilized during each cycle to remove excess precursor from the process chamber and/or remove excess reactant and/or reaction byproducts from the process chamber after conversion of the chemisorbed precursor. Further, the term "atomic layer deposition," as used herein, is also meant to include processes designated by related terms such as, "chemical vapor atomic layer deposition", "atomic layer epitaxy" (ALE), molecular beam epitaxy (MBE), gas source MBE, or organometallic MBE, and chemical beam epitaxy when performed with alternating pulses of precursor composition(s), reactive gas, and purge (e.g., inert carrier) gas.

As used herein, the term "chemical vapor deposition" (CVD) may refer to any process wherein a substrate is exposed to one or more volatile precursors, which react and/or decompose on a substrate surface to produce a desired deposition.

As used herein, the term "film" and "thin film" may refer to any continuous or non-continuous structures and material deposited by the methods disclosed herein. For example, "film" and "thin film" could include 2D materials, nanorods, nanotubes, or nanoparticles or even partial or full molecular layers or partial or full atomic layers or clusters of atoms and/or molecules. "Film" and "thin film" may comprise material or a layer with pinholes, but still be at least partially continuous.

As used herein, the term "contaminant" may refer to any unwanted material disposed within the reaction chamber that may affect the purity of a substrate disposed in the reaction chamber, or any unwanted material in any component of a reaction system. The term "contaminant" may refer to, but is not limited to, unwanted deposits, metal and non-metal particles, impurities, and waste products, disposed within the reaction chamber or other components of the reactor system.

Reactor systems used for ALD, CVD, and/or the like, may be used for a variety of applications, including depositing and etching materials on a substrate surface. In various embodiments, a reactor system 50 may comprise a reaction chamber 4, a susceptor 6 to hold a substrate 30 during processing, a fluid distribution system 8 (e.g., a showerhead) to distribute one or more reactants to a surface of substrate 30, one or more reactant sources 10, 12, and/or a carrier and/or purge gas source 14, fluidly coupled to reaction chamber 4 via lines 16-20, and valves or controllers 22-26. Reactant gases or other materials from reactant sources 10, 12 may be applied to substrate 30 in reaction chamber 4. A purge gas from purge gas source 14 may be flowed to and through reaction chamber 4 to remove any excess reactant or other undesired materials from reaction chamber 4. System 50 may also comprise a vacuum source 28 fluidly coupled to the reaction chamber 4, which may be configured to suck reactants, a purge gas, or other materials out of reaction chamber 4. System 50 may comprise a filter system 40 disposed between reaction chamber 4 and vacuum source 28 to trap (i.e., accumulate) materials (e.g., contaminants) coming from reaction chamber 4, reducing or preventing contamination of reactor system 50 components downstream of filter system 40.

Figure 2:
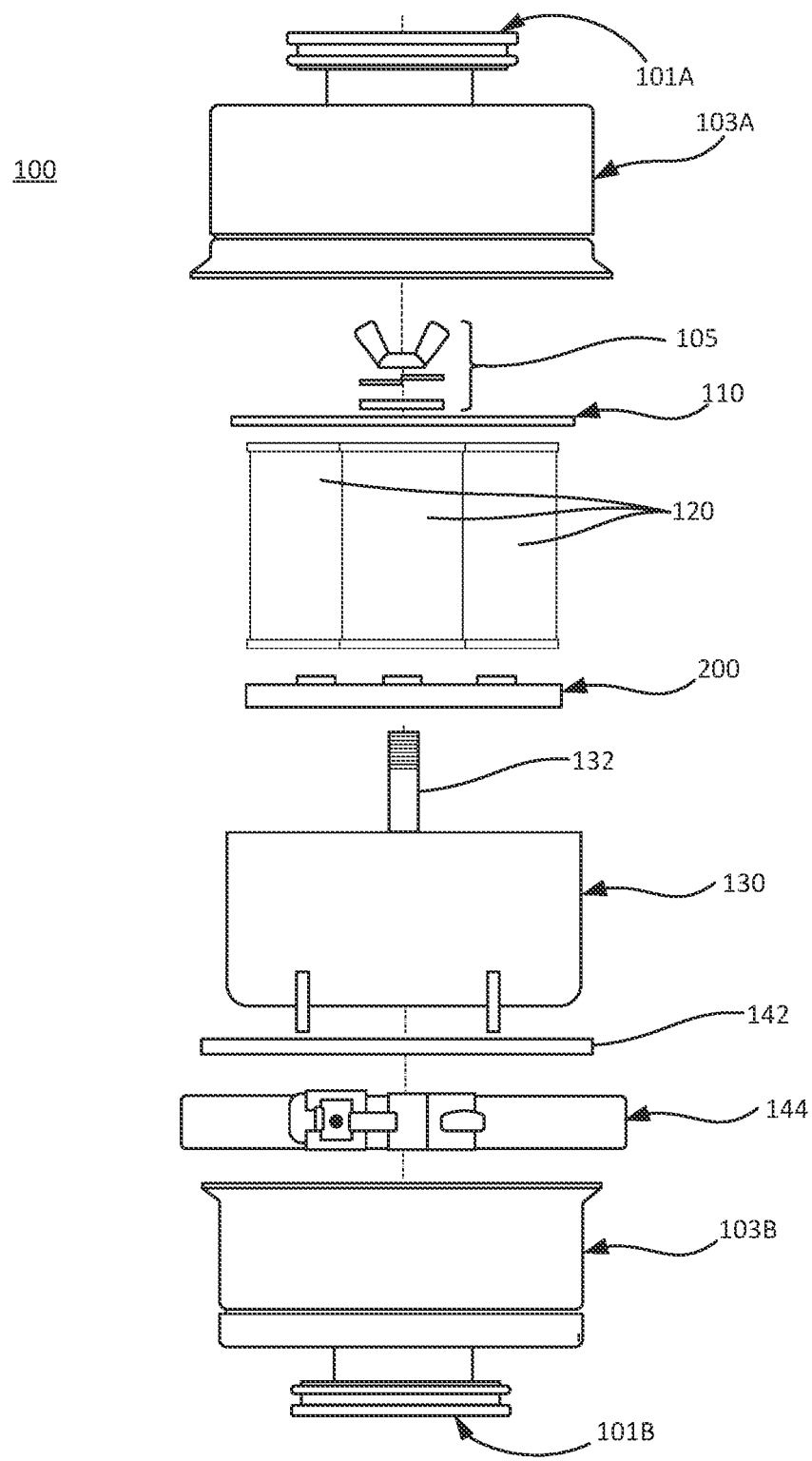
FIG. 2 illustrates an exploded view of an exemplary filter system, in accordance with various embodiments.

With reference to FIG. 2, a filter system 100 (an exploded view thereof) is illustrated, in accordance with various embodiments. Filter system 100 can be the same as or similar to filter system 40. In various embodiments, filter system 100 may comprise an outer filter housing 103, which may comprise multiple components (e.g., upper outer housing 103A and lower outer housing 103B). In various embodiments, upper outer housing 103A and lower outer housing 103B may couple to enclose other components of filter system 100. Upper outer housing 103A may comprise a fluid inlet 101A, through which the interior of outer housing 103 may be fluidly coupled to a reaction chamber (e.g., reaction chamber 4). Gases and other material may flow from the reaction chamber into filter system 100 through fluid inlet 101A, and may exit filter system 100 through fluid outlet 101B.

In various embodiments, filter system 100 may comprise a filter vessel 130. Filter vessel 130 may be disposed in one or more components of outer filter housing 103. For example, filter vessel 130 may be disposed in lower outer housing 103B and/or upper outer housing 103A. In various embodiments, upper outer housing 103A may couple with filter vessel 130, enclosing and/or sealing a filter vessel interior space of filter vessel 130. Accordingly, filter vessel 130 may comprise a shape (e.g., an outer shape) complementary to a shape of the interior of upper outer housing 103A and/or lower outer housing 103B.

Figure 6:
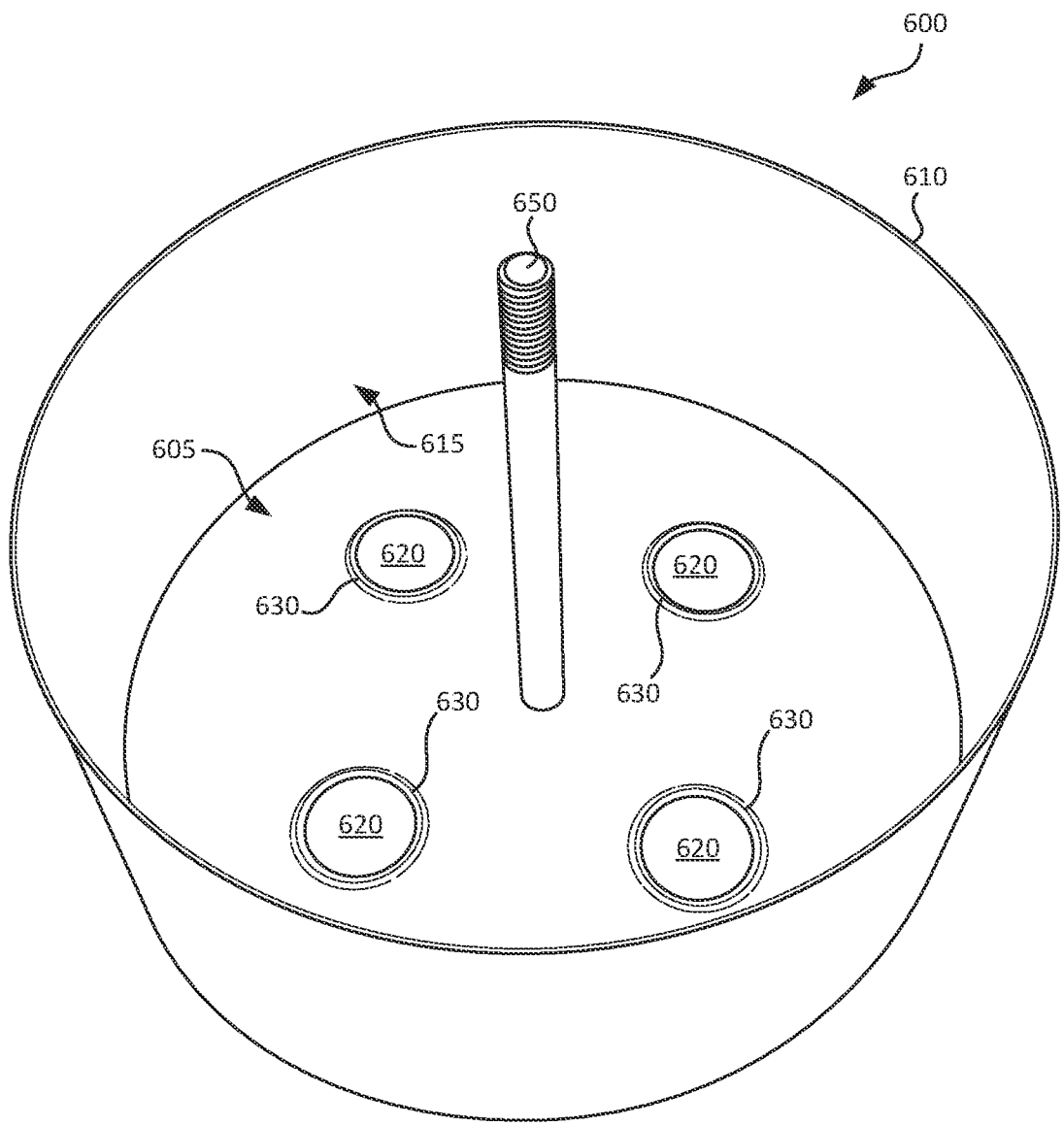
FIG. 6 illustrates a perspective view of an exemplary filter vessel of a filter system, in accordance with various embodiments.

With additional reference to FIG. 6, a filter vessel 600 (an example of filter vessel 130 in FIG. 2) may comprise a filter vessel outer wall 610 having a wall interior surface 615. Wall interior surface 615 may define and/or enclose an interior space of filter vessel 600. In various embodiments, outer wall 610 may engage and/or couple with an upper outer housing (e.g., upper outer housing 103A) to enclose and/or seal the interior space of filter vessel 600.

In various embodiments, the lower bound of the interior space of filter vessel 600 may be a vessel bottom spanning between the outer wall 610 or portions thereof. The vessel bottom may comprise a vessel bottom surface 605. Vessel bottom surface may comprise one or more vessel bottom holes 620 disposed through the vessel bottom. The interior space of filter vessel 600 may be in fluid communication with fluid outlet 101B via the vessel bottom holes 620. In various embodiments, a vessel bottom hole 620 may be defined by a vessel bottom hole edge. A vessel bottom hole 620 may comprise any suitable shape.

In various embodiments, vessel bottom surface 605 may comprise a vessel bottom rim 630 protruding from vessel bottom surface 605. Vessel bottom rim 630 may be disposed at or proximate a respective vessel bottom hole edge. In various embodiments, each vessel bottom hole 620 may comprise a vessel bottom rim 630 disposed at or proximate the respective vessel bottom hole edge. Vessel bottom rim 630 may at least partially surround a respective vessel bottom hole 620, forming a shape of the vessel bottom rim 630.

In various embodiments, filter vessel 600 may comprise a coupling rod 650 protruding from vessel bottom surface 605. Coupling rod 650 may comprise any suitable shape, length, and/or cross-sectional shape. In various embodiments, coupling rod 650 may protrude from vessel bottom surface 605 above a plane defined by an upper edge of vessel outer wall 610 (wherein a height of vessel outer wall 610 spans between the vessel bottom surface and the vessel outer wall 610 upper edge). Coupling rod 650 may be configured to engage and/or couple with other components of filter system 100. In various embodiments, at least a portion of coupling rod 650 may comprise threading.

With reference again to FIG. 2, in various embodiments, filter system 100 may comprise a filter plate 200. Filter plate 200 may be disposed in filter vessel 130, for example, adjacent to and/or coupled to the filter vessel bottom surface (e.g., filter vessel bottom surface 605 of filter vessel 600 in FIG. 6).

With additional reference to FIGS. 4A-4C, a filter plate 400 (an example of filter plate 200 in FIG. 2) may comprise a first plate face 405, a second plate face 410, and a plate body 415 spanning between first plate face 405 and second plate face 410. First plate face 405 and/or second plate face 410 may comprise any suitable configuration, such as being substantially flat, concave, or convex. In various embodiments, filter plate 400 may comprise at least one plate hole 420 disposed through first plate face 405, second plate face 410, and plate body 415 spanning therebetween. In various embodiments, a plate hole 420 may be defined by a plate hole edge 422. A plate hole 420 may comprise any suitable shape.

In various embodiments, first plate face 405 may comprise a plate hole rim 430 protruding from first plate face 405. Plate hole rim 430 may be disposed at or proximate a respective plate hole edge 422. In various embodiments, each plate hole 420 may comprise a plate hole rim 430 disposed at or proximate the respective plate hole edge 422. Plate hole rim 430 may at least partially surround a respective plate hole 420, forming a shape of the plate hole rim 430. In various embodiments, a plate hole rim may be any protrusion from first plate face 405 (e.g., that is used at least to dispose a filter in a desired position on first plate face 405).

In various embodiments, filter plate 400 may comprise a coupling hole 455. Coupling hole 455 may comprise a shape that is complementary to the cross-sectional shape of coupling rod 650 of filter vessel 600 in FIG. 6. Accordingly, coupling rod 650 may be disposed through coupling hole 455, such that coupling rod 650 maintains a desired position of filter plate 400 within the interior space of filter vessel 600.

With combined reference to FIGS. 4A-C and 6, in various embodiments, filter plate 400 may be disposed adjacent to bottom surface 605 of filter vessel 600. Second plate face 410 may be in contact with bottom surface 605 of filter vessel 600. The shape of filter plate 400 may be complementary to a cross-sectional shape of the interior space of filter vessel 600, such that filter plate 400 may be disposed therein. Accordingly, an outer edge of filter plate 400 may be disposed adjacent to, and/or in contact with, outer wall interior surface 615 of filter vessel outer wall 610. Filter plate 400 may fit within the interior space of filter vessel 600 such that little or no fluid may pass between the outer edge of filter plate 400 and outer wall interior surface 615 of filter vessel outer wall 610, and/or between second plate face 410 and filter vessel bottom surface 605.

In various embodiments, vessel bottom rim 630 may engage and/or couple with filter plate 400 to maintain filter plate 400 in a desired position on or relative to filter vessel bottom surface 605 and/or a vessel bottom hole 620. In various embodiments, vessel bottom rim 630 may comprise a shape that is complementary to the shape of plate hole 420, such that each vessel bottom rim 630 may be disposed in a respective vessel bottom hole 620. For example, each of the four vessel bottom rims 630 in FIG. 6 may be disposed within a respective one of the four plate holes 420. In such embodiments, each vessel bottom rim 630 may be disposed proximate or against the plate hole edge 422 of the respective plate hole 420.

In various embodiments, filter plate 400 may comprise a filter plate recess 425 disposed into plate body 415 through second plate face 410. A filter plate recess 425 may not be disposed completely through filter plate 400, but only partially into plate body 415 through second plate face 410 toward first plate face 405. A filter plate recess 425 may be disposed on filter plate 400 proximate and/or adjacent to a plate hole 420. In various embodiments, a filter plate recess 425 may be disposed at least partially surrounding a respective plate hole 420. For example, as shown in FIG. 4C, there may be a plate recess 425 disposed around each respective plate hole 420.

Each filter plate recess 425 may comprise any suitable shape. In various embodiments, a filter plate recess 425 may comprise a shape that is complementary to the shape of a vessel bottom rim 630, such that the vessel bottom rim 630 may be disposed in a respective filter plate recess 425. In such embodiments, a vessel bottom rim 630 may engage and/or couple with a respective filter plate recess 425. For example, a vessel bottom hole 620 may be larger than a plate hole 420. A vessel bottom rim 630 at least partially surrounding a vessel bottom hole 620 may be disposed in a respective filter plate recess 425 at least partially surrounding the respective plate hole 420. In various embodiments, a vessel bottom rim 630 may be disposed adjacent to, and/or in contact with, an outer edge of a respective filter plate recess 425, such that there is little or no space between the vessel bottom rim 630 and the outer edge of the respective filter plate recess 425. The engaging and/or coupling of a vessel bottom rim 630 with a respective filter plate recess 425 may be configured to maintain filter plate 400 in a desired position on or relative to filter vessel bottom surface 605 and/or a vessel bottom hole 620.

Filter plate 400 engaging and/or coupling to vessel bottom surface 605 via a vessel bottom rim 630 may align each plate hole 420 with a respective vessel bottom hole 620 so fluid may travel therethrough. Relatedly, in various embodiments, the filter plate recesses 425 disposed in filter plate 400 and/or the vessel bottom rims 630 provide a self-aligning quality to filter plate 400 and its disposal into filter vessel 600 and against filter vessel bottom surface 605. That is, the vessel bottom rim(s) 630 of the filter vessel may only engage a respective and/or complementary portion of filter plate 400 (e.g., plate holes 420 and/or filter plate recesses 425) in response to filter plate 400 being correctly positioned within filter vessel 600.

With reference back to FIG. 2, filter system 100 may comprise one or more filters 120. Filters 120 may be disposed on filter plate 200 and within filter vessel 130.

Figures 3A, 3B:
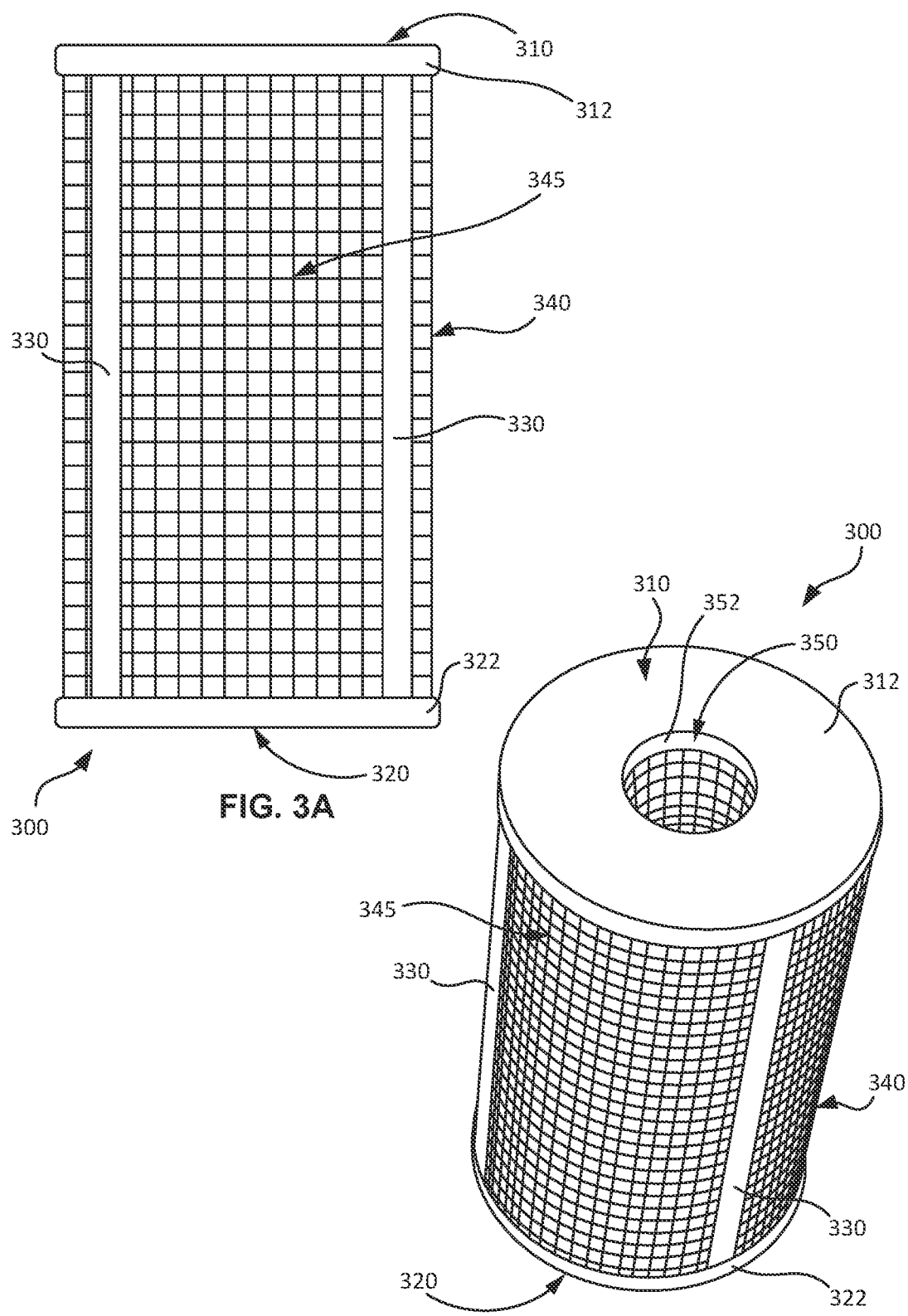
FIGS. 3A and 3B illustrate perspective views of an exemplary filter comprised in a filter system, in accordance with various embodiments.

With additional reference to FIGS. 3A and 3B, a filter 300 (an example of filter 120 in FIG. 2) may comprise a filter first end 310, a filter second end 320, and a filter body therebetween. The filter body 340 may comprise a filter material configured to accumulate or trap materials flowing through the filter material. The filter material may comprise any suitable material, such as wire mesh and/or any material comprising a geometry providing surface area (e.g., a high surface area to volume ratio) upon which contaminants may deposit (e.g., materials traveling from reaction chamber 4). Filter body 340 may comprise a filter wall 345 surrounding the filter material. Filter wall 345 may comprise any suitable configuration, such as a mesh, a screen, or any other permeable or perforated material (i.e., a material and/or configuration through which fluids may flow).

In various embodiments, filter 300 may comprise an end cap on one or more of filter first end 310 and filter second end 320. For example, filter first end 310 may comprise a first filter end cap 312, and filter second end 320 may comprise a second filter end cap 322. The end caps may be disposed over the ends of filter wall 345. The end caps may be configured such that fluids may not pass therethrough.

In various embodiments, filter 300 may comprise at least one support bar 330 spanning between first filter end cap 312 and second filter end cap 322. Support bar 330 may provide structure to filter body 340, the filter material, and/or filter wall 345. Support bar 330 may be coupled to first filter end cap 312 and/or second filter end cap 322. In various embodiments, support bar 330 may be integral with, and/or monolithic with, first filter end cap 312 and/or second filter end cap 322, such that there are no seams between such components.

In various embodiments, no adhesive or other coupling material may be used to couple a support bar 330 to first filter end cap 312 and/or second filter end cap 322. The absence of an adhesive, epoxy, or other coupling material mitigates the risk of such a coupling material outgassing and traveling to the reaction chamber, acting as a contaminant therein. Additionally, without such a coupling material, filter 300 may not be susceptible to degradation at elevated temperatures, for example, greater than 120° C. Therefore, a filter system comprising filter 300 (e.g., filter system 100 in FIG. 2) may be moved closer to a reaction chamber of a reactor system (e.g., reaction chamber 4 of reactor system 50 in FIG. 1) than a filter system comprising a filter with a coupling material. Accordingly, a reactor system having a filter system comprising filter 300 may be more compact and/or have more feasible configurations and special arrangements.

In various embodiments, filter 300 may comprise a filter bore 350 disposed in and/or surrounded by filter body 340 and/or the filter material. A portion of filter wall (or the same/similar material) may surround filter bore 350. Filter bore 350 may span at least a portion of a filter length of filter 300 between filter first end 310 and filter second end 320. In various embodiments, filter bore 350 may span through filter first end 310 and/or filter second end 320. In various embodiments, filter bore 350 may span through first filter end cap 312 and/or second filter end cap 322. In various embodiments, filter bore 350 may span the entire length of filter 300, including through filter first end 310 and filter second end 320, and if filter 300 comprises end caps, through first filter end cap 312 and second filter end cap 322.

In various embodiments, a portion of filter bore 350 disposed through filter first end 310 and/or first filter end cap 312 may be configured to engage with and/or couple to a filter plate (e.g., filter plate 400 in FIGS. 4A-4C). With additional reference to FIGS. 4A-4C and 6, filter bore 350 may be configured to be in fluid communication with a respective plate hole 420 and bottom surface hole 620d of filter vessel 600. Filter bore 350 disposed through filter first end 310 (and/or first filter end cap 312) may comprise a cross-sectional shape, at least a portion of which is complementary with the shape of a plate hole rim 430. Accordingly, plate hole rim 430 may engage with and/or couple to the filter bore 350 portion through filter first end 310 (and/or first filter end cap 312). For example, a plate hole rim 430, associated with a respective plate hole 420, may be disposed within the portion of filter bore 350 disposed through filter first end 310 (and/or first filter end cap 312), such that filter bore 350 is in fluid communication with the respective plate hole 420. In various embodiments, a plate hole rim 430 may be disposed adjacent to, and/or in contact with, a filter bore outer edge 352, such that there is little or no space between the plate hole rim 430 and filter bore outer edge 352.

The complementary shape of filter bore 350 proximate filter first end 310 to the shape of plate hole rim 430 allows for easy alignment and placement of a filter 300 on filter plate 400 in filter vessel 600. That is, plate hole rim 430 of a plate hole 420 may only engage the filter bore 350 of a respective filter 300 in response to filter 300 being correctly positioned on filter plate 400 within filter vessel 600, therefore, facilitating alignment of a respective filter bore 350, plate hole 420, and/or vessel bottom hole 620.

Figure 5:
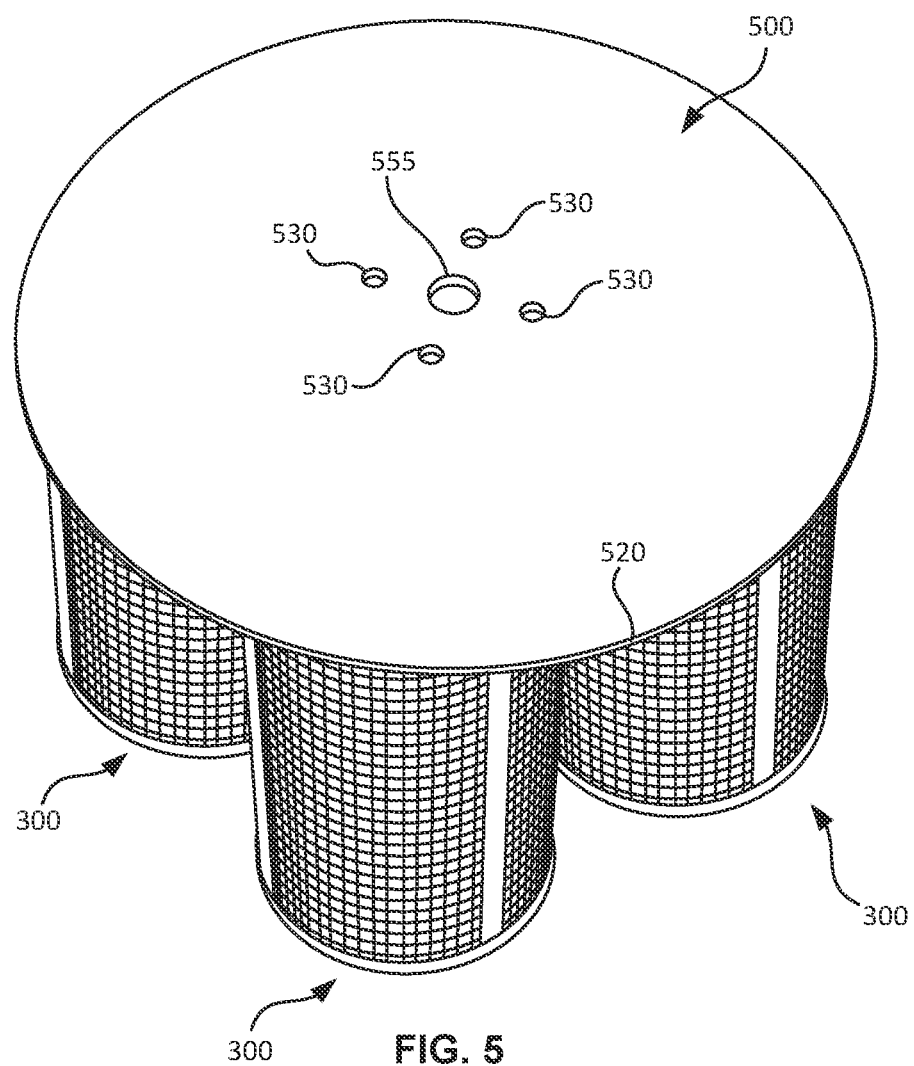
FIG. 5 illustrates an exemplary top baffle disposed on filters of a filter system, in accordance with various embodiments.
Figure 7A:
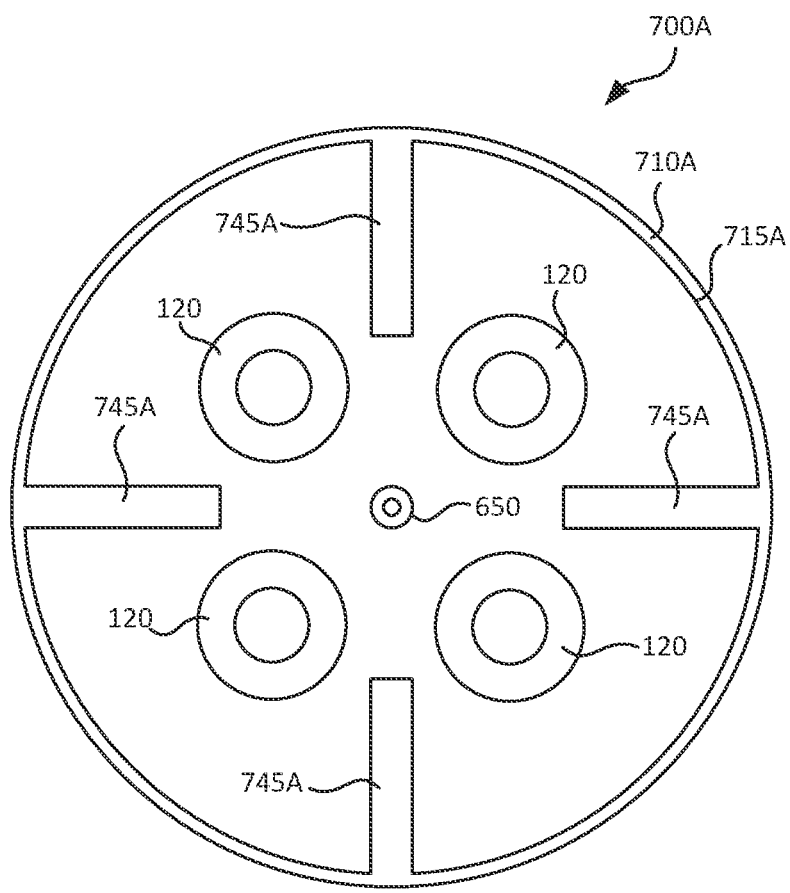
FIGS. 7A-7C illustrate exemplary filter vessels having various configurations, in accordance with various embodiments.
Figure 7B:
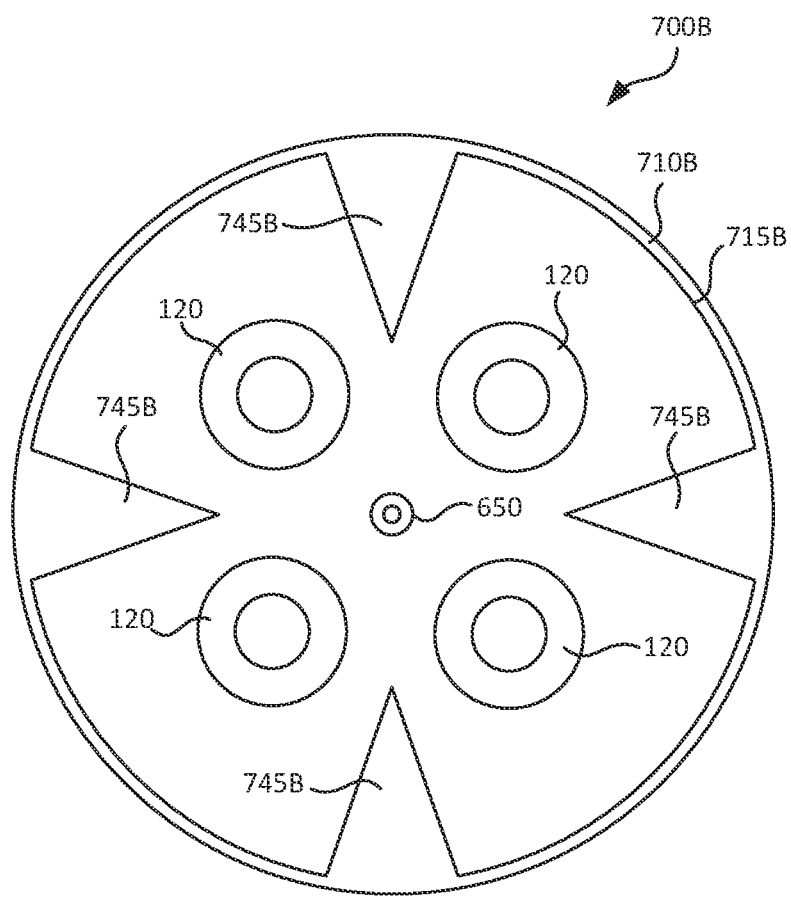
Figure 7C:
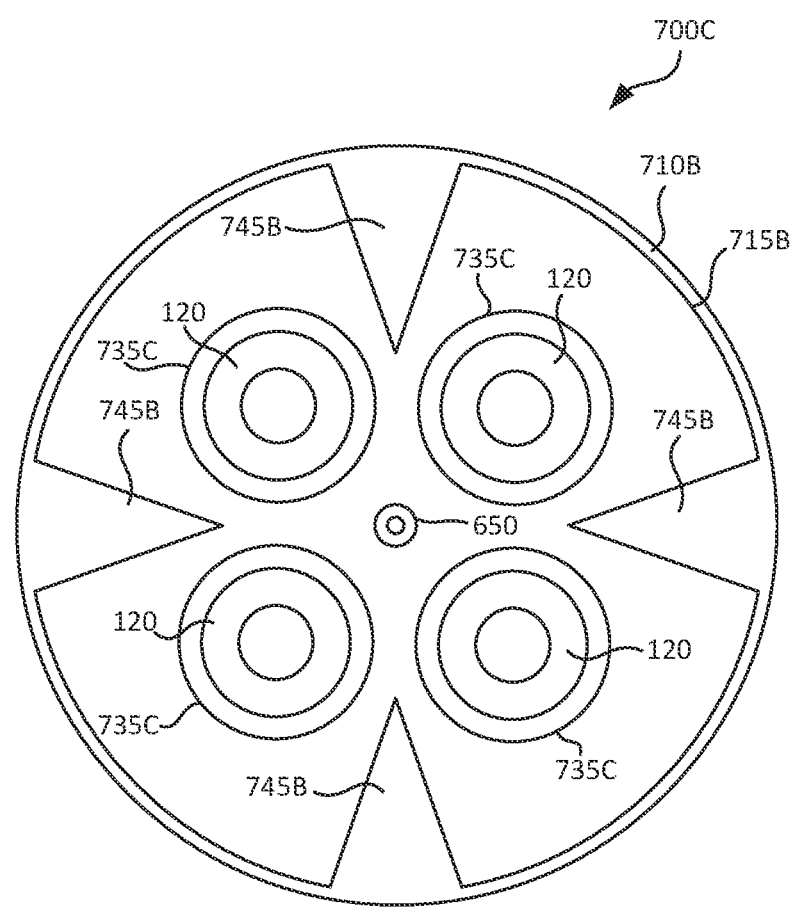

In various embodiments, a filter system (e.g., filter system 100) of a reactor system may comprise multiple filters 300. For example, as depicted and/or indicated in FIGS. 3A, 3B, 4A-4C, 5, and 6, a filter system may comprise four filters 300 in filter vessel 600. The four plate holes 420 on filter plate 400 may align with the four vessel bottom holes 620, as described herein. Similarly, the filter bore 350 of each of four filters 300 may align with a respective four plate holes 420, such that each vessel bottom hole 620 is aligned and in fluid communication with a respective plate hole 420 and filter bore 350. Four filters 300 disposed on filter plate 400 and in filter vessel 600 may be comprised in the configurations depicted in FIG. 5 in FIGS. 7A-7C (which depict top perspective views of filters 120 from FIG. 2). A filter system and/or filter vessel may comprise any suitable number of filters in any suitable arrangement.

In various embodiments, with reference back to FIG. 2, filter system 100 may comprise a baffle plate 110. With additional reference to FIGS. 3A, 3B, 5, and 6, a baffle plate 500 (an example of baffle plate 110 in FIG. 2) may be disposed on filters 300 (discussed in relation to FIGS. 3A,B). In various embodiments, baffle plate 500 may cause fluid flow entering the interior space of filter vessel 600 to take a certain path (e.g., a path that will maximize fluid flow through filters 300, and/or allow maximum removal of contaminants from the fluid flow by the filter system and its components). Baffle plate 500 may reduce or prevent fluid flow from traveling around or through filter second end 320, second filter end cap 322, and/or a portion of filter bore 350 disposed through filter second end 320 and/or second filter end cap 322. That is, baffle plate 500 may form at least a partial seal between baffle plate 500 and filter second end 320 and/or second filter end cap 322. Baffle plate 500 may be configured to cause at least a portion of fluid flow within a filter vessel to flow around baffle plate edge 520 toward and through filters 300 and portions thereof more proximate to wall interior surface 615 than other portions of filters 300. In various embodiments, baffle plate 500 may comprise one or more baffle holes 530 proximate a center of baffle plate 500. Baffle holes 530 may be configured to cause fluid flow to travel therethrough, toward and through filters 300 and portions of filters 300 more proximate a center of the interior space of filter vessel 600 than other portions of filters 300 (e.g., between filters 300 disposed under baffle plate 500). Baffle holes on a baffle plate may be in any suitable position or any suitable configuration to achieve desired fluid flow toward and through filters.

In various embodiments, coupling system 105 shown in FIG. 2 may couple baffle plate 110 and/or filter plate 200 to filter vessel 130, for example, by engaging with and/or coupling to coupling rod 132 (an example of coupling rod 650 in FIG. 6). For example, at least one component of coupling system 105 may engage with the threading on coupling rod 132.

In various embodiments, the components of filter system 100 may be clamped and/or sealed together via sealing ring 142 and/or clamping ring 144. A sealing ring 142 may be disposed between filter vessel 130 and upper outer housing 103A, between upper outer housing 103A and lower outer housing 103B, between filter vessel 130 and lower outer housing 103B, and/or in any other suitable location. Sealing ring 142 may be comprised of any suitable material, such as rubber, a polymeric material, and/or the like to at least partially seal the filter system components around the interior space of filter vessel 130. Clamping ring 144 may be disposed around upper outer housing 103A and/or lower outer housing 103B, and may be configured to be tightened to hold components of filter system 100 together.

Figure 8:
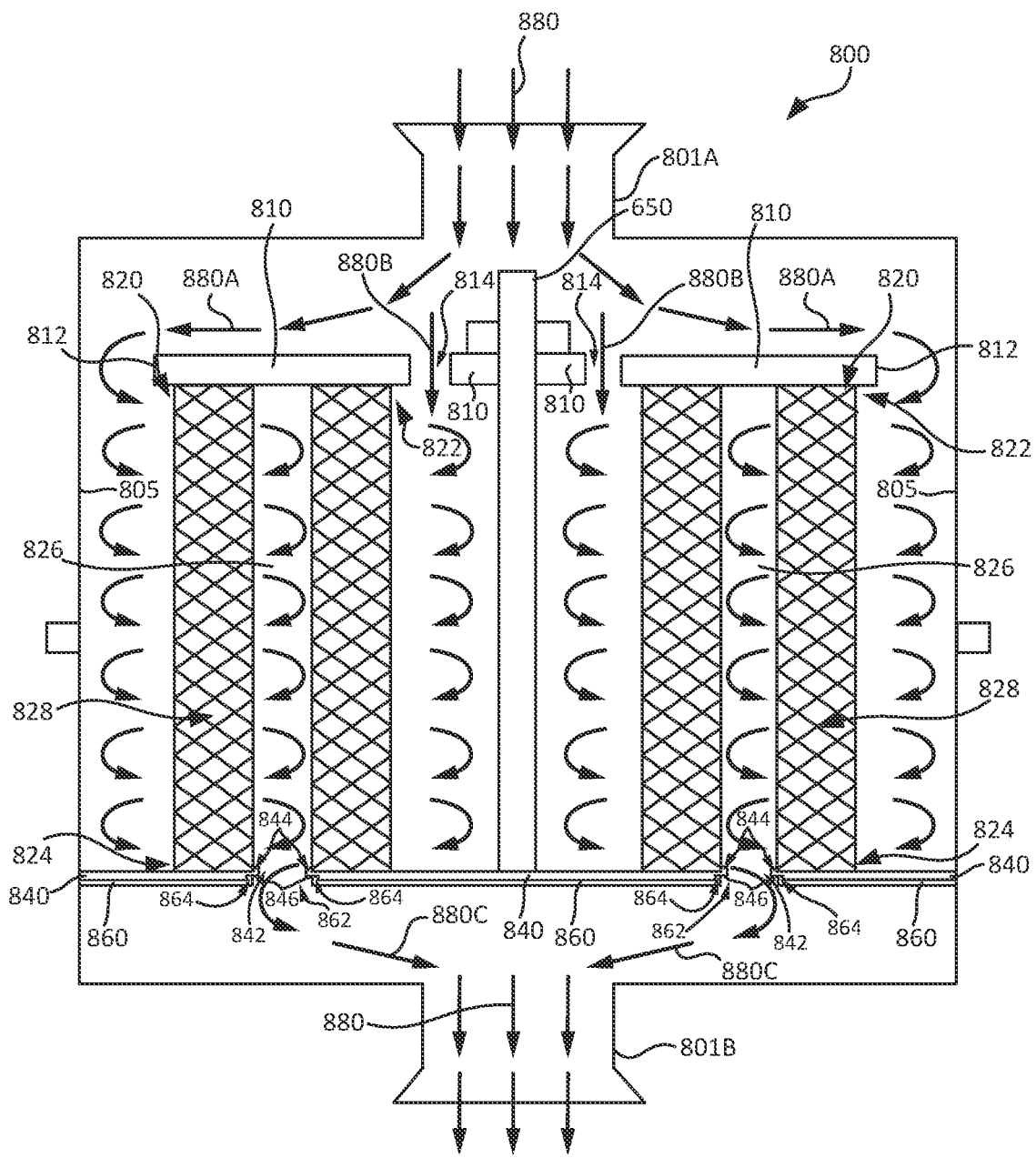
FIG. 8 illustrates a cross section of an exemplary filter vessel comprising a top baffle, filters, and a filter plate, and fluid flow though the filter vessel, in accordance with various embodiments.
Figure 9:
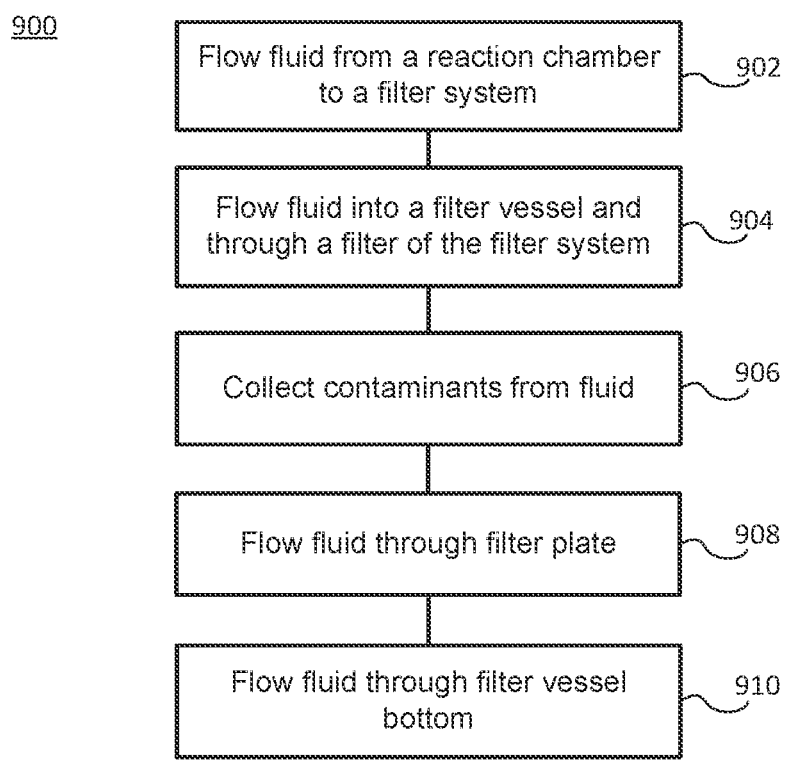
FIG. 9 illustrates a method of flowing fluid through a filter system of a reactor system, in accordance with various embodiments.

FIG. 9 illustrates a method 900 of flowing fluid through a filter system in a reaction system, in accordance with various embodiments. With additional reference to FIGS. 3A-3B, 4A-4C, 5, 6, and 8, a fluid may flow from a reaction chamber (e.g., reaction chamber 4 in FIG. 1) to a filter system (e.g., filter system 100 in FIG. 2, or filter system 800 in FIG. 8) (step 902). Filter system 800 in FIG. 8 may comprise a fluid inlet 801A and a fluid outlet 801B of an outer filter housing (similar to fluid inlet 101A and fluid outlet 101B of outer filter housing 103 in FIG. 2). Fluid 880 may flow into filter system 800 through fluid inlet 801A. Fluid 880 may comprise materials which the filter system is configured to remove from fluid 880 (e.g., contaminants).

In various embodiments, the fluid may flow into a filter vessel (e.g., filter vessel 600 or filter vessel 130 in FIG. 2), and through a filter 820 (similar to filter 300 or filter 120 of FIG. 2) (step 904). In various embodiments, the filter vessel may be coupled to and/or a part of the outer filter housing of the filter system. In various embodiments, an upper outer housing (e.g., upper outer housing 103A of FIG. 2) may couple to and/or engage with the filter vessel to enclose an interior space of the filter vessel and/or outer filter housing, which houses and encloses the filter(s).

After entry to the filter vessel, fluid 880 may contact baffle plate 810 (an example of baffle plate 500 and baffle plate 110 in FIG. 2). Baffle plate 810 may direct at least a portion of fluid 880 (e.g., fluid 880A) around an outer edge 812 (an example of outer edge 520 of baffle plate 500) to contact a wall interior surface 805 (an example of wall interior surface 615 of filter vessel 600) and/or to contact and/or pass through portions of filters 820 more proximate wall interior surface 805 than other portions of filters 820 (e.g., portions of filters 820 facing one another). In various embodiments, baffle plate 810 may direct at least a portion of fluid 880 (e.g., fluid 880B) through baffle holes 814 (examples of baffle holes 530) to contact and/or pass through portions of filters 820 more proximate a center of the interior space of the filter vessel, or more proximate other filters 820, than other portions of filters 820 (e.g., portions of filters 820 facing wall interior surface 805).

Fluid 880A and 880B may pass through the filter material 828 of filters 820 into the filter bore 826 (an example of filter bore 350) in each filter 820. The filter material may collect contaminants from fluid 880 (step 906) as fluid 880 flows through the filter material. As an additional part of the collecting a contaminant from fluid 880 of step 906, contaminants may be deposited on surfaces within the filter system, such as on wall interior surface 805, the filter wall (e.g., filter wall 345), a filter end cap(s), and/or any other component of filter 820 or filter system 800. According, with reference to FIGS. 7A-7C, in various embodiments, the filter vessel outer wall of the illustrated filter vessels may comprise one or more protrusions extending out from the wall interior surface into the internal space of the filter vessel (i.e., from the wall internal surface toward the filter(s) disposed in the internal space of the filter vessel). Such protrusions may comprise any suitable shape, and may provide additional surface area upon which contaminants may deposit or collect.

A filter vessel and/or filter system may comprise any suitable number of protrusions in any suitable shape, arrangement, and/or configuration. For example, in FIG. 7A, a filter vessel 700A may comprise a filter vessel outer wall 710A (an example of filter vessel outer wall 610) surrounding a filter vessel internal space, in which filters 120 may be disposed (top perspective views of filters 120 in FIG. 2). Filter vessel outer wall 710A may comprise one or more protrusions 745A extending from wall interior surface 715A into the vessel internal space. Protrusions 745A may comprise a substantially rectangular shape. As another example, in FIG. 7B, a filter vessel 700B may comprise a filter vessel outer wall 710B (an example of filter vessel outer wall 610) surrounding a filter vessel internal space, in which filters 120 may be disposed (top perspective views of filters 120 in FIG. 2). Filter vessel outer wall 710B may comprise one or more protrusions 745B extending from wall interior surface 715B into the vessel internal space. Protrusions 745B may comprise a substantially triangular shape. As yet another example, in FIG. 7C, filter vessel 700C may comprise filter vessel outer wall 710B, which may comprise one or more protrusions 745B extending from wall interior surface 715B into the vessel internal space. In various embodiments, the bottom surface of the vessel internal space (e.g., first plate face 405 of filter plate 400 in FIGS. 4A-4C) may comprise protrusions 735C extending from the bottom surface into the vessel internal space. Protrusions 735C may be alternative or in addition to protrusions 745B from wall interior surface 715B. Protrusions 745A,B and 735C may provide additional surface area upon which contaminants in fluid flowing through the respective filter vessel and/or system may deposit, thus removing such contaminants from the fluid.

In various embodiments, continuing with method 900, fluid 880 may flow through filter bores 826, including through filter first ends 824 of filters 820, and through filter plate 840 (an example of filter plate 400 or filter plate 200 in FIG. 2) (step 908). Fluid 880 flowing through filter plate 840 may comprise minimal or no contaminants. Filter plate 840 may comprise plate holes 842 disposed therethrough between a first plate face (e.g., first plate face 405) and a second plate face (e.g., second plate face 410) of filter plate 840. Filter plate 840 may further comprise plate hole rim 844 (an example of plate hole rim 430 of filter plate 400) engaged with and/or coupled to filter 820 and/or filter bore 826, for example, as described herein with relation to filter plate 400 and filter 300. Accordingly, filter bores 826 may be aligned and/or in fluid communication with plate holes 842. Therefore, fluid 880 may flow from filter bore 826 through filter plate 840 via plate holes 842. Filter plate 840 may further comprise filter plate recesses 846 disposed into filter plate 840 through the second plate face.

In various embodiments, fluid 880 may flow through filter vessel bottom surface 860 (an example of filter vessel bottom surface 605 of filter vessel 600) and the filter vessel bottom (step 910). Filter vessel bottom surface 860 may comprise vessel bottom holes 862 disposed through the vessel bottom. Filter vessel bottom surface 860 may further comprise vessel bottom rim 864 (an example of vessel bottom rim 630 of filter vessel 600) engaged with and/or coupled to filter plate 840, for example, engaging and/or coupling with plate holes 842 and/or plate recesses 846, and/or as described herein with relation to filter plate 400 and filter vessel 600. Accordingly, plate holes 842 may be aligned and/or in fluid communication with vessel bottom holes 862. Therefore, fluid 880 may flow from filter bore 826 through filter plate 840 via plate holes 842, and through filter vessel bottom surface 860 via vessel bottom holes 862.

Subsequently, fluid 880 may flow through fluid outlet 801B, and out of filter system 800.

The components of the systems discussed herein may be comprised of any suitable material such as metal or metal alloy (e.g., steel, aluminum, aluminum alloy, or the like).

Although exemplary embodiments of the present disclosure are set forth herein, it should be appreciated that the disclosure is not so limited. For example, although reactor and filter systems are described in connection with various specific configurations, the disclosure is not necessarily limited to these examples. Various modifications, variations, and enhancements of the system and method set forth herein may be made without departing from the spirit and scope of the present disclosure.

The subject matter of the present disclosure includes all novel and nonobvious combinations and subcombinations of the various systems, components, and configurations, and other features, functions, acts, and/or properties disclosed herein, as well as any and all equivalents thereof.

What is claimed is:

1. A filter system of a reactor system, comprising:
a filter vessel comprising an outer wall, wherein the outer wall at least partially defines an interior space of the filter vessel;
a filter plate disposed in the interior space, the filter plate comprising:
a first plate face and a second plate face with a plate body spanning therebetween;
a first plate hole disposed through the plate body spanning between the first plate face and the second plate face; and
a plate hole rim protruding from the first plate surface, wherein the plate hole rim is disposed at or proximate a plate hole edge defining the first plate hole, and at least partially surrounding the first plate hole;
a plurality of filters, including a first filter, disposed on the first plate face, wherein the first filter engages with the plate hole rim such that the plate hole rim positions the first filter in a desired position,
wherein the first filter comprises a filter bore disposed through a filter first end and a filter second end, the filter first end being opposite the filter second end, wherein the filter bore is in fluid communication with the first plate hole; and
a baffle plate disposed on the filter second end, wherein the baffle plate at least one of prevents or reduces a fluid from entering the filter bore through the filter second end and facilitates the fluid passing through a portion of the plurality of filters more proximate the outer wall, wherein the baffle plate comprises a baffle plate hole disposed through the baffle plate facilitating a portion of the fluid to flow through the baffle plate, between the plurality of filters, and through a portion of the plurality of filters more proximate a center of the interior space of the filter vessel.

2. The filter system of claim 1, wherein a shape of the plate hole rim is complementary to at least a portion of a shape of the filter bore at the filter first end, wherein the filter first end is contacting the first plate face, such that the plate hole rim is disposed within the filter bore.

3. The filter system of claim 1, wherein the first filter comprises a filter material surrounding the filter bore and spanning between the filter first end and the filter second end, wherein the filter first end comprises a first filter end cap disposed thereon, and the filter second end comprises a second filter end cap disposed thereon, wherein the first filter end cap and the second filter end cap are coupled to a support bar spanning between the first filter end cap and the second filter end cap, wherein the support bar is at least one of monolithic or integral with the first filter end cap and the second filter end cap.

4. The filter system of claim 1, further comprising a plurality of plate holes, including the first plate hole, disposed through the plate body, each having a respective plate hole rim disposed at or proximate a respective plate hole edge for each of the plurality of plate holes, wherein each of the plurality of filters comprises a respective filter bore, wherein each respective plate hole rim of the plurality of plate holes is disposed within the respective filter bore of one of the plurality of filters.

5. The filter system of claim 1, wherein the filter vessel comprises a vessel bottom surface comprising a vessel bottom hole disposed through the vessel bottom surface, wherein the filter plate is disposed on the vessel bottom surface such that the first plate hole and the filter bore are in fluid communication with the vessel bottom hole.

6. The filter system of claim 5, wherein the vessel bottom surface comprises a vessel bottom rim protruding from the vessel bottom surface and at least partially surrounding the vessel bottom hole, wherein the vessel bottom rim engages with the filter plate to control a position of the filter plate.

7. The filter system of claim 6, wherein the filter plate comprises a filter plate recess into the plate body through the second plate face, wherein a shape of the filter plate recess is complementary to a shape of the vessel bottom rim, wherein the vessel bottom rim is disposed in the filter plate recess.

8. The filter system of claim 1, wherein the outer wall comprises at least one protrusion extending from the outer wall into the interior space of the filter vessel between at least two of the plurality of filters.

* * * * *